2 Sheets--Sheet 1.

W. F. PRUSHA & E. L. WALES.

Boots and Shoes.

No. 6,421. Reissued May 4, 1875.

Witnesses,
W. J. Cambridge
H. W. Clark

Inventors,
William F. Prusha
Elisha L. Wales
per Teschemacher & Stearns
Attys

2 Sheets--Sheet 2.

W. F. PRUSHA & E. L. WALES.

Boots and Shoes.

No. 6,421. Reissued May 4, 1875.

Witnesses,
W. J. Cambridge
H. D. Clark

Inventors,
William F. Prusha
Elisha L. Wales
per Teschemacher & Stearns
Attys

UNITED STATES PATENT OFFICE.

WILLIAM F. PRUSHA AND ELISHA L. WALES, OF MARLBOROUGH, MASS., ASSIGNOR, BY MESNE ASSIGNMENTS, TO WM. B. RICE, TRUSTEE.

IMPROVEMENT IN BOOTS AND SHOES.

Specification forming part of Letters Patent No. 114,340, dated May 2, 1871; reissue No. 6,421, dated May 4, 1875; application filed April 2, 1875.

*To all whom it may concern:*

Be it known that we, WILLIAM F. PRUSHA and ELISHA L. WALES, of Marlborough, in the county of Middlesex and State of Massachusetts, have invented certain Improvements in Boots and Shoes, of which the following is a full, clear, and exact description, reference being had to the accompanying drawings, making part of this specification, in which—

Figure 1:
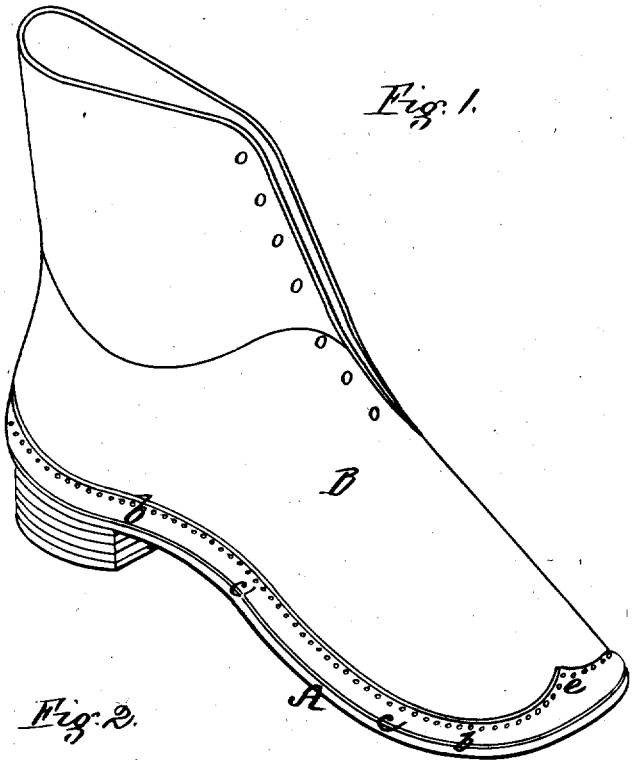
Figure 2:
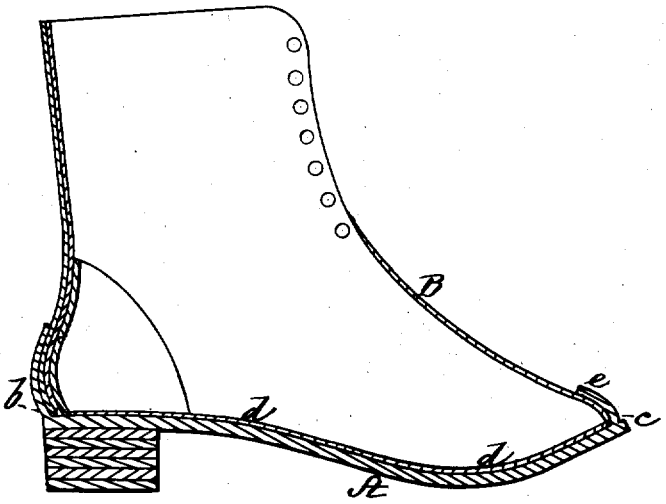
Figure 3:
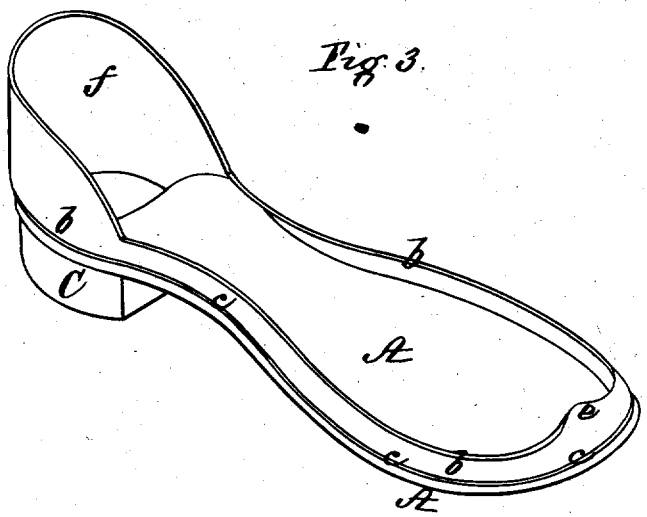
Figure 4:
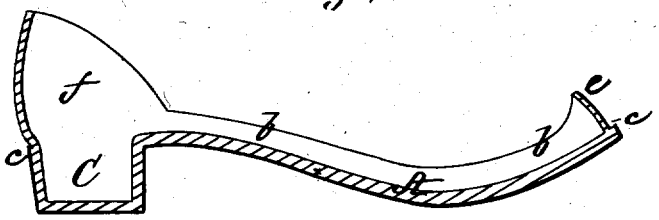

Figure 1 is a perspective view of a shoe made in accordance with our invention. Fig. 2 is a central vertical section through the same. Fig. 3 is a perspective view of the sole and the projecting portion, the heel being formed in one and the same piece therewith. Fig. 4 is a central vertical section through the same.

The object of our invention is to cheapen the manufacture of boots and shoes, and at the same time enable us to produce a superior article; and our invention consists in molding or "striking up" a leather sole with a projecting portion, to which the upper is secured by rivets, stitching, or otherwise, the sole being finished, and, together with the projecting portion, perfectly shaped to fit the foot at the time it is molded, a crease or indentation being also formed to represent the division between the upper and the sole of an ordinary boot or shoe, by which construction the inner sole is dispensed with, together with the operation of lasting, and also the labor of trimming and finishing the edge of the outer sole, while the boot is pliable and easy to the foot; and our invention also consists in forming a leather tip or protector at the toe of the boot or shoe by molding or striking it up in one and the same piece with a sole outside the upper leather, the crease to represent the division between the upper and the sole being formed at the same time or afterward.

To enable others skilled in the art to understand and use our invention, we will proceed to describe the manner in which we have carried it out.

In the said drawings, A represents the sole of the shoe. This sole is formed of a piece of leather cut to the proper shape, and then compressed when wet in a suitable die, which gives it the form seen in the drawings, with a projecting portion, *b*, turned up all around its edge, the portion *b* and also the sole being finished and perfectly shaped to fit the foot at the time it is molded or struck up, while a crease or indentation, *c*, is also made at the same time or afterward, to represent the division-line between the upper and the sole of an ordinary boot or shoe. This crease can be made to represent on the outside any desired thickness of sole. Previous to putting the leather in the die, the edge which forms the portion *b* may be skived down, so as to leave it of less thickness than the sole. After the sole has been removed from the die the upper B is secured to the projecting portion by means of rivets, stitching, or in any other suitable manner, which operation leaves the shoe as seen in Fig. 1.

The inner sole of an ordinary boot or shoe adds nothing to its wear, but is required, in order that the different parts may be properly secured together, and can only be dispensed with in a turned shoe. Our improved construction, however, enables us to dispense with the inner sole entirely, thus effecting a saving of stock, while the operation of lasting and the labor of trimming and finishing the edge of the outer sole are also dispensed with, resulting in a considerable saving of labor.

A thin lining, *d*, of any suitable material, is pasted upon the inside of the sole A, to give the interior of the shoe a neat and finished appearance. The portion *b* serves to protect the shoe all around its edge, and when cut so as to extend up at the toe, as seen at *e* in the drawings, it serves as a leather toe-tip or protector, which is molded or formed in one and the same piece with the sole A, and with a crease or indentation to represent the division between the sole and the upper.

In Figs. 3 and 4 the portion *b* is cut so as as to extend up at the heel, as seen at *f*, thereby forming a stiffening, and enabling us to dispense with the separate counter or stiffener usually employed.

It is evident that instead of striking up the portion *b* entirely around the sole, it may be formed to extend up from one or more portions only of the sole; for instance, at the toe, to form a tip, or at the heel, to form a stiffener, or both, the upper being secured to the remaining portion of the sole by pegs or stitching in the ordinary manner. In such case, however, an inner sole would be required.

We are aware that leather soles have been struck up, as shown in Patent to W. G. Slater, December 20, 1870, for an improvement in the manufacture of boot-packs; but we are not aware that a finished leather sole for boots and shoes has been made by being struck up, as herein described, prior to our invention thereof. We are also aware that rubber soles with tips and creases have been molded for the manufacture of rubber shoes; but this is not our invention.

What we claim as our invention, and desire to secure by Letters Patent as an improvement in the manufacture of boots and shoes, is—

1. A leather sole having a crease or indentation, *c*, and projecting struck-up portion *b* for attachment to the upper, substantially in the manner and for the purpose described.

2. A leather toe-tip or projection struck up in one and the same piece with a sole outside of the upper leather, and with a crease or indentation, *c*, substantially as set forth.

Witness our hands this 3d day of March, A. D. 1875.

WILLIAM F. PRUSHA.
ELISHA L. WALES.

Witnesses as to W. F. P.:
EDWIN SMITH, Jr.,
W. H. HOEFMAN.
Witnesses as to E. L. W.:
HORATIO H. HUTCHINS,
WILLARD HOWE.